(12) United States Patent
Enge

(10) Patent No.: US 8,930,556 B2
(45) Date of Patent: Jan. 6, 2015

(54) AUTHENTICATION BASED ON RANDOM BITS IN SATELLITE NAVIGATION MESSAGES

(75) Inventor: Per K. Enge, Mountain View, CA (US)

(73) Assignee: The Boeing Company, Chicago, IL (US)

( * ) Notice: Subject to any disclaimer, the term of this patent is extended or adjusted under 35 U.S.C. 154(b) by 191 days.

(21) Appl. No.: 13/603,316

(22) Filed: Sep. 4, 2012

(65) Prior Publication Data

US 2013/0060955 A1    Mar. 7, 2013

Related U.S. Application Data

(60) Provisional application No. 61/531,046, filed on Sep. 5, 2011.

(51) Int. Cl.
*G06F 15/16*      (2006.01)
*G01S 19/21*      (2010.01)

(52) U.S. Cl.
CPC .................................. *G01S 19/215* (2013.01)
USPC ............................... 709/229; 709/224; 726/3

(58) Field of Classification Search
CPC ...................... H04L 9/0852; H04L 2012/5604
USPC ........... 709/200, 224, 229; 726/3; 342/357.21
See application file for complete search history.

(56) References Cited

U.S. PATENT DOCUMENTS

| | | |
|---|---|---|
| 5,754,657 A | 5/1998 | Schipper et al. |
| 5,757,916 A * | 5/1998 | MacDoran et al. ............ 380/258 |
| 6,934,631 B2 | 8/2005 | Dentinger et al. |
| 7,609,201 B2 | 10/2009 | Masuda |
| 7,969,354 B2 | 6/2011 | Levin et al. |
| 2009/0195354 A1 | 8/2009 | Levin et al. |
| 2009/0195443 A1 | 8/2009 | Levin et al. |
| 2010/0134352 A1* | 6/2010 | Thomson et al. ......... 342/357.09 |

FOREIGN PATENT DOCUMENTS

WO    WO2007083270 A1    7/2007

OTHER PUBLICATIONS

International Search Report and Written Opinion of the International Searching Authority mailed on Feb. 22, 2013 for PCT/US2012/053810 application filed on Sep. 5, 2012, priority date: Sep. 5, 2011.
Scott Logab, "Anti-Spoofing and Authentication Signal Architectures for Civil Navigation System", Proceeding of ION GPS/GNSS, vol. 2003, Jan. 1, 2003, pp. 1543-1552, XP002436415.

* cited by examiner

*Primary Examiner* — El Hadji Sall
(74) *Attorney, Agent, or Firm* — Ameh IP; Elahe Toosi; Lowell Campbell

(57) ABSTRACT

A system and methods for location authentication are presented. A subset of demodulated server received navigation signals are selected synchronized to client bit frames to provide synchronized server bit frames. A function of the synchronized server bit frames is computed to provide a server signature set. A client signature set and the server signature set are compared to provide a comparison result, and a location of a client device is authenticated based on the comparison result.

17 Claims, 12 Drawing Sheets

US 8,930,556 B2

AUTHENTICATION BASED ON RANDOM BITS IN SATELLITE NAVIGATION MESSAGES

CROSS-REFERENCE TO RELATED APPLICATION

This application claims the benefit of U.S. Provisional Application Ser. No. 61/531,046, filed on Sep. 5, 2011, the content of which is incorporated by reference herein in its entirety.

FIELD

Embodiments of the present disclosure relate generally to radio communication and navigation systems. More particularly, embodiments of the present disclosure relate to satellite systems for location validation.

BACKGROUND

A significant fraction of power in a secret signal component of a navigation satellite signal such as a Global Navigation Satellite System (GNSS) signal may be lost when the GNSS signal passes through band pass filters used by a GNSS client device (receiver). The loss of power degrades performance in low signal-to-noise-ratio (SNR) environments. Degraded performance in low SNR environments may prevent or minimize an ability of an authentication system to validate that a global position computation or an assertion based on a global position is bona fide.

SUMMARY

A system and methods for location authentication are presented. A subset of demodulated server received navigation signals are synchronized to client bit frames to provide synchronized server bit frames. A function of the client bit frames is computed to provide a client signature set. A function of the synchronized server bit frames is computed to provide a server signature set. The client signature set and the server signature set are compared to provide a comparison result, and a location of a client device is authenticated based on the comparison result.

In this manner, embodiments of the disclosure provide an authentication system that enables location authentication for client devices located in low signal-to-noise-ratio (SNR) environments such as indoors and downtown.

In an embodiment, a method for location authentication selects a subset of demodulated server received navigation signals synchronized to client bit frames to provide synchronized server bit frames. The method further computes a function of the synchronized server bit frames to provide a server signature set. The method further compares a client signature set and the server signature set to provide a comparison result, and authenticates a location of a client device based on the comparison result.

In another embodiment, a location authentication system comprises a server data frame selector module, a server data operation module, a server correlation module, and an authenticate module. The server data frame selector module selects a subset of demodulated server received navigation signals synchronized to client bit frames to provide server bit frames. The server data operation module computes a function of the synchronized server bit frames to provide a server signature set. The server correlation module compares a client signature set and the server signature set to provide a comparison result. The authenticate module authenticates a location of a client device based on the comparison result.

In a further embodiment, a non-transitory computer readable storage medium comprises computer-executable instructions for location authentication. The computer-executable instructions select a subset of demodulated client received navigation signals to provide client bit frames. The computer-executable instructions further compute a function of the client bit frames to provide a client signature set. The computer-executable instructions further transmit the client signature set to an authentication server for authentication of a location of a client device.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to communication systems, network protocols, global positioning systems, and other functional aspects of the systems (and the individual operating components of the systems) may not be described in detail herein.

Embodiments of the disclosure are described herein in the context of a non-limiting application, namely, an authentication system for a mobile phone application. Embodiments of the disclosure, however, are not limited to such mobile phone applications, and the techniques described herein may also be utilized in other applications. For example, embodiments may be applicable to a desktop computer, a laptop or notebook computer, an iPod™, an iPod™, a mainframe, a server, a client, or any other type of special or general purpose computing device as may be desirable or appropriate for a given application or environment.

As would be apparent to one of ordinary skill in the art after reading this description, the following are examples and embodiments of the disclosure and are not limited to operating in accordance with these examples. Other embodiments may be utilized and changes may be made without departing from the scope of the exemplary embodiments of the present disclosure.

Embodiments of the disclosure provide an authentication system that provides adequate received signal strength for a navigation satellite signal to be received at a client device (client) located in a low signal-to-noise-ratio (SNR) environment such as indoors in a city building.

Figure 1:
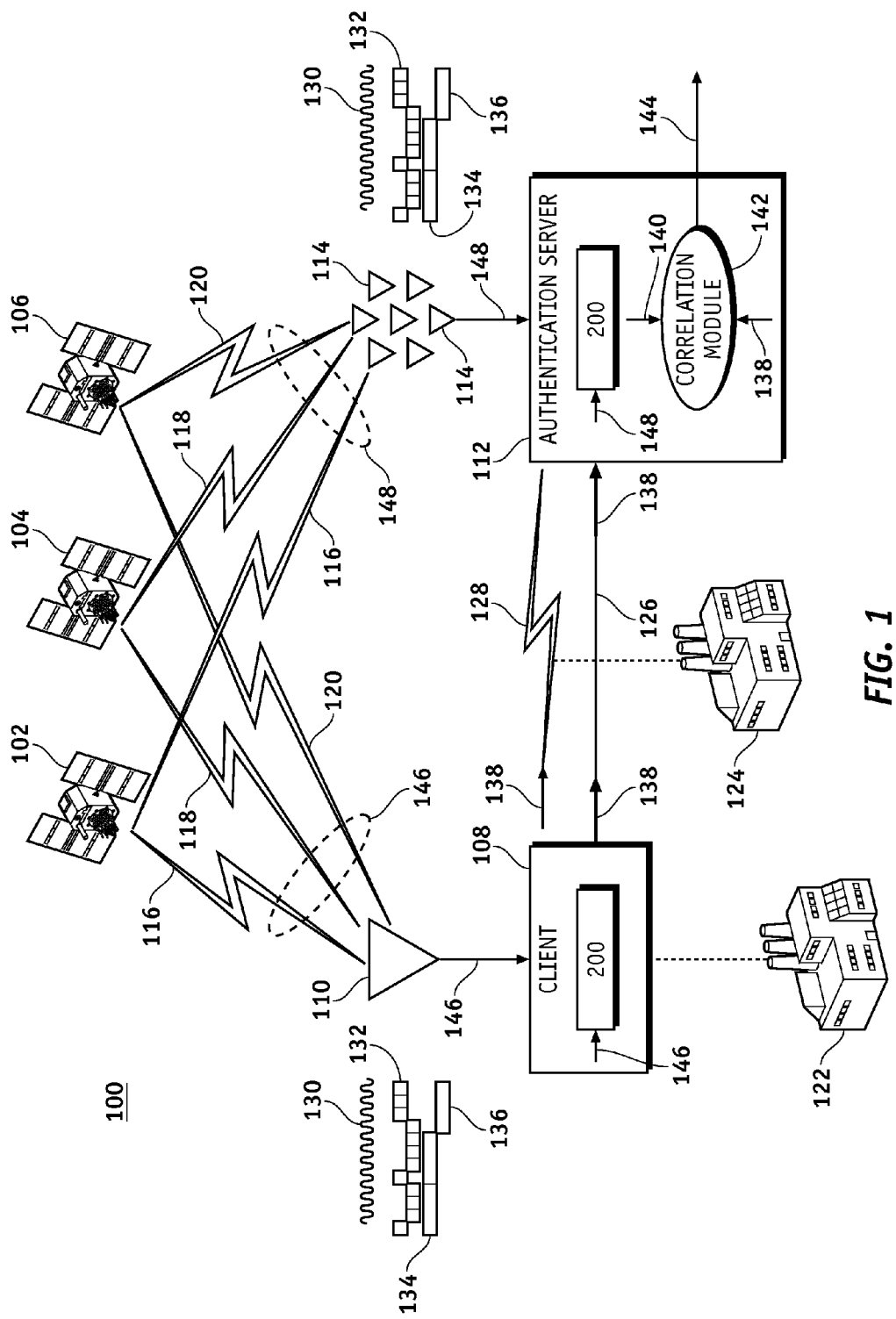
FIG. 1 is an illustration of an exemplary wireless communication environment for authenticating an asserted location based on navigation satellite signals according to an embodiment of the disclosure.

FIG. 1 is an illustration of an exemplary wireless communication environment 100 (environment 100) for authenticating an asserted location based on navigation satellite signals according to an embodiment of the disclosure. The environment 100 may comprise navigation satellites 102, 104 and 106, a client 108 comprising a satellite receiver 200 (navigation satellite receiver 200), and an authentication server 112 comprising a satellite receiver 200 (navigation satellite receiver 200).

Each of the navigation satellites 102-106 may comprise a Global Navigation Satellite System (GNSS) satellite, a Global Positioning System (GPS™) satellite, a Globalnaya Navigatsionnaya Sputnikovaya Sistema (GLONASS™) satellite, a BeiDou Navigation System (COMPASS™) satellite, a Galileo™ satellite, or other navigation satellite.

Navigation satellite signals 116, 118 and 120 transmitted from the navigation satellites 102, 104 and 106 respectively can be processed at the client 108 to determine a velocity, a time and a location 122 of the client 108. However, navigation satellite signals may be spoofed in existing systems such that an existing client senses and/or reports a false position 124. Spoofing is becoming of general concern because navigation satellites are increasingly being used to support location transactions that have financial value or safety-of-life implications.

Each of the navigation satellite signals 116-120 comprises a signal 130 at a frequency (carrier frequency) such as a GPS L1 frequency, which is used as a carrier (in-phase carrier 130) to modulate a data signal that is modulated with a spreading code such as a Code Division Multiple Access (CDMA) code, commonly referred to as a "Coarse/Acquisition" (C/A) code (spectrum-spreading code 132). For a GPS system, the C/A code may be variously known as "Coarse/Acquisition", "Clear/Access", and "Civil/Access". Each of the navigation satellites 102-106 transmits at least one other signal employing the carrier frequency that is shifted 90 degrees (Quadrature signal, not shown). The at least one other signal (second signal) is modulated by another code, known as an encrypted "P(Y)" code (not shown). The P(Y) code is either a "precision" (P) code, which is publicly known, or an encrypted "Y" code. Many GNSS satellites use the Y code and, consequently, a resulting transmitted signal that is encoded with the Y code cannot be used by other than those having a decryption algorithm and a key for the Y code.

In addition, a navigation message 134 modulates both the (known) P and the (unknown) Y code broadcast by the navigation satellites 102, 104, 106.

For example, in commercial applications, the C/A code is publicly known and, consequently, an existing navigation satellite receiver can be vulnerable to spoofing. In existing systems, a hostile party can generate a facsimile of one or more satellite signals that carry incorrect information. An existing navigation satellite receiver at a client device that accepts the bogus signals may be spoofed to compute an incorrect position, and may be spoofed to compute a position that the hostile party wishes to have the existing navigation satellite receiver compute. Spoofing may be ineffective on those able to use the Y code because this code is not publicly known, so a hostile party should not be able to create a signal that appears bona fide.

However, a significant fraction of signal power in the (secret) Y code signal component may be lost when each of the navigation satellite signals 116-120 pass through a band pass filter used by the navigation satellite receiver 200 at the client 108. Loss of signal power may degrade performance of the client 108 in low signal-to-noise-ratio (SNR) environments. Degrading performance may reduce an ability of the authentication server 112 to provide confidence that a global position computation, or an assertion based on a global position, is bona fide.

Embodiments of the disclosure provide a means for authenticating the location 122 based on random or pseudorandom information contained in the navigation message 134 broadcast by the navigation satellites 102, 104, 106 or other navigation transmitters. Thereby, an improved coverage is provided where the navigation satellite signals 116-120 can be obstructed as compared to existing methods.

The client 108 comprises the navigation satellite receiver 200 and is configured to track and locate the client 108 based on receiving the navigation message 134 of each of the navigation satellite signals 116-120 through client received satellite navigation signals 146 (client received navigation signals 146) via a client antenna 110. The client 108 is configured to estimate navigation data bits 136 contained in the navigation message 134 of a multiplicity of the client received navigation signals 146 to provide client bit frames 1030 (comprising navigation messages 502/504/506 demodulated from the client received navigation signals 146, FIG. 10). In one embodiment, the client 108 computes a function such as an exclusive OR (XOR) 1008 (FIG. 10) across the client bit frames 1030 (i.e., from the navigation satellites 102, 104, 106) to provide a client signature set 138 of a client asserted location for the location 122 as explained in more detail below.

The client 108 may support many consumer applications. For example, many financial transactions utilize cell phones as the client 108 indoors in a city building. The client 108 may comprise, wired or wireless communication devices such as, but without limitation, a desktop computer, a laptop or notebook computer, an iPod™, an iPod™, a mainframe, a server, or other type of special or general purpose computing device that comprises a receiver such as the navigation satellite receiver 200 capable of receiving the client received navigation signals 146, and as may be desirable or appropriate for a given application or environment.

The authentication server 112 is configured to receive or estimate (calculate) the client signature set 138 for the location 122. The authentication server 112 may receive the client signature set 138 via a wired communication link 126, a wireless communication channel 128, a combination thereof, or estimate (calculate) the client signature set 138 locally at the authentication server 112. The authentication server 112 comprises the navigation satellite receiver 200 and is also configured to receive the navigation message 134 (navigation messages) of the navigation satellite signals 116-120 through server received navigation signals 148 via a server antenna 114.

Figure 10:
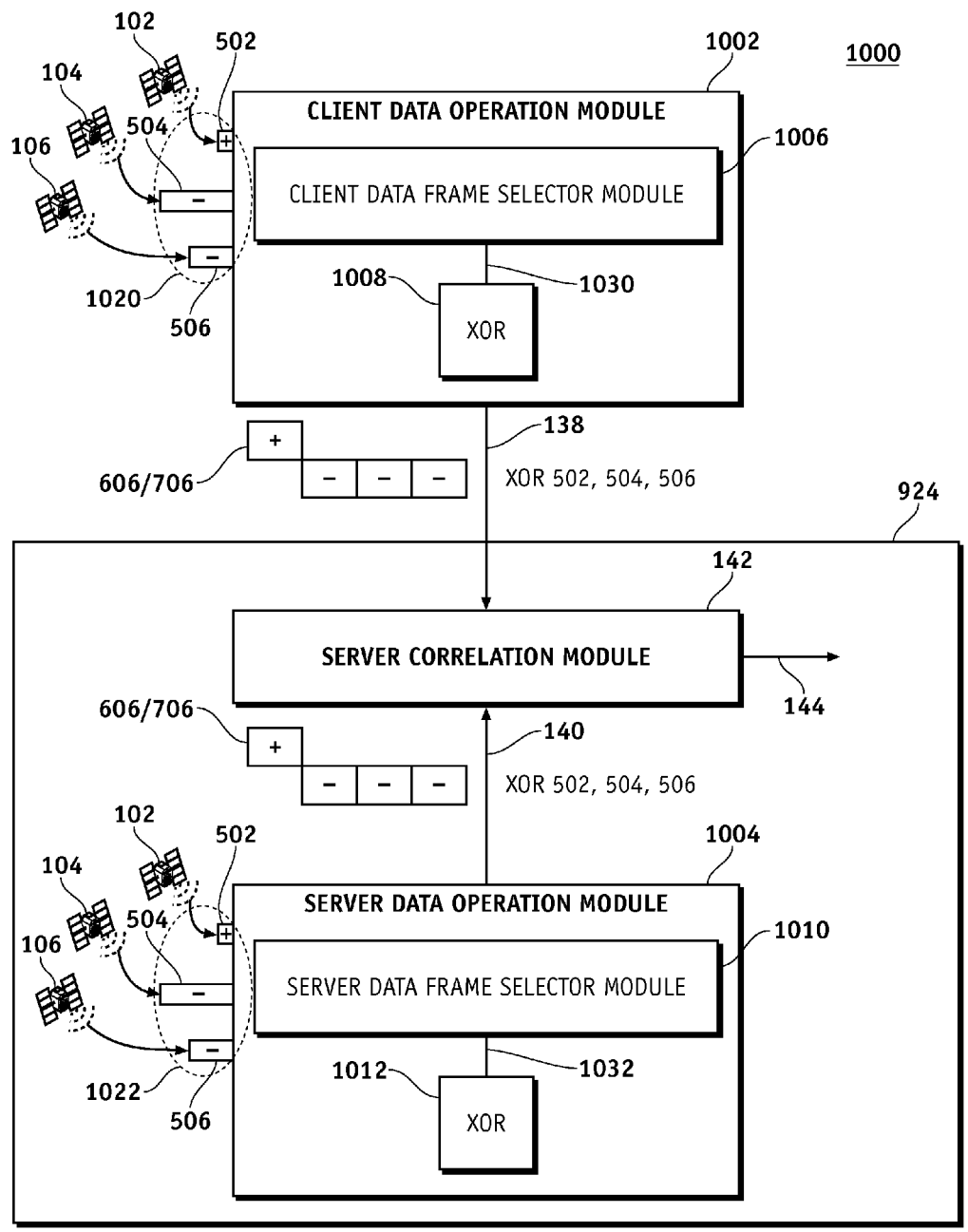
FIG. 10 is an illustration of an exemplary functional block diagram of an authentication system according to an embodiment of the disclosure.

The authentication server 112 also estimates navigation data bits 136 contained in the navigation message 134 of the server received navigation signals 148 synchronized to the client bit frames 1030 to provide synchronized server bit frames 1032 (FIG. 10). The authentication server 112 computes a function of the synchronized server bit frames 1032 to provide a server signature set 140 as explained in more detail below. In one embodiment, the client signature set 138 and the server signature set 140 are compared by a server correlation module 142 to generate an authentication decision message 144. The authentication server 112 determines a validity of an asserted location of the location 122 of the client 108 based on the navigation message 134, and generates the authentication decision message 144 indicating validity or invalidity of the asserted location. Validity indicates there is acceptable accuracy and/or certainty that the client 108 is located at the asserted location, and invalidity indicates there is not acceptable accuracy and/or certainty that the client 108 is located at the asserted location.

Many financial transactions utilize cell phones as the client 108 in an "indoors" or "downtown" environment, where they occur on platforms that are low cost and operating in obstructed signal environments. Two criteria may be important to a design of such a cost-effective navigation satellite-based authentication system. First, data should be available from the navigation satellite receiver 200 included in the cell phone. Second, the navigation satellite-based authentication system should compensate for the client received navigation signals 146 that are expected where cell phone users congregate e.g., "indoors" and "downtown". The first criterion is reflected in FIG. 2 that shows basic signal processing steps in the navigation satellite receiver 200. The second criterion for a navigation satellite-based authentication system is depicted in FIG. 3.

Figure 2:
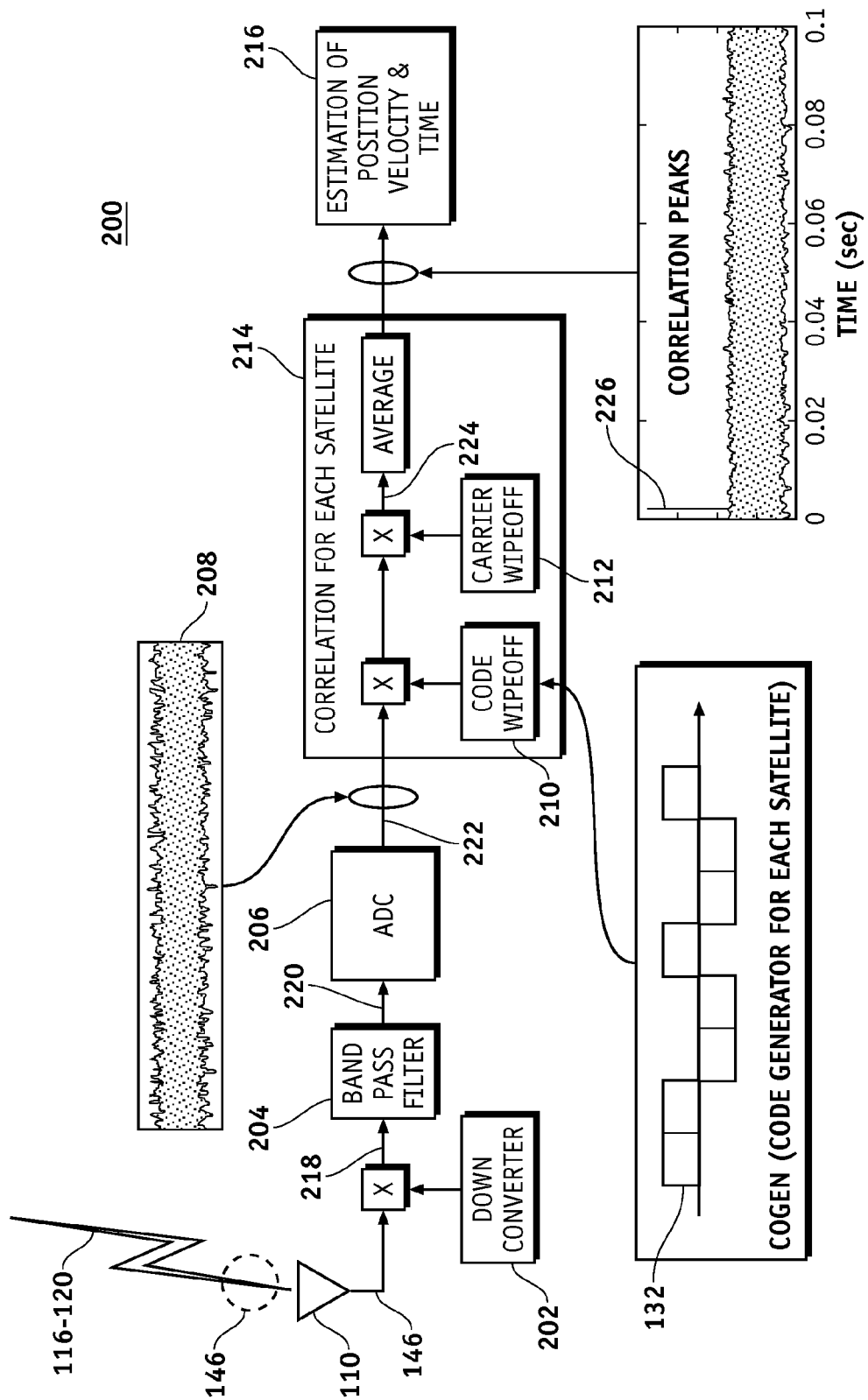
FIG. 2 is an illustration of an exemplary simplified functional block diagram of a navigation satellite receiver.
Figure 3:
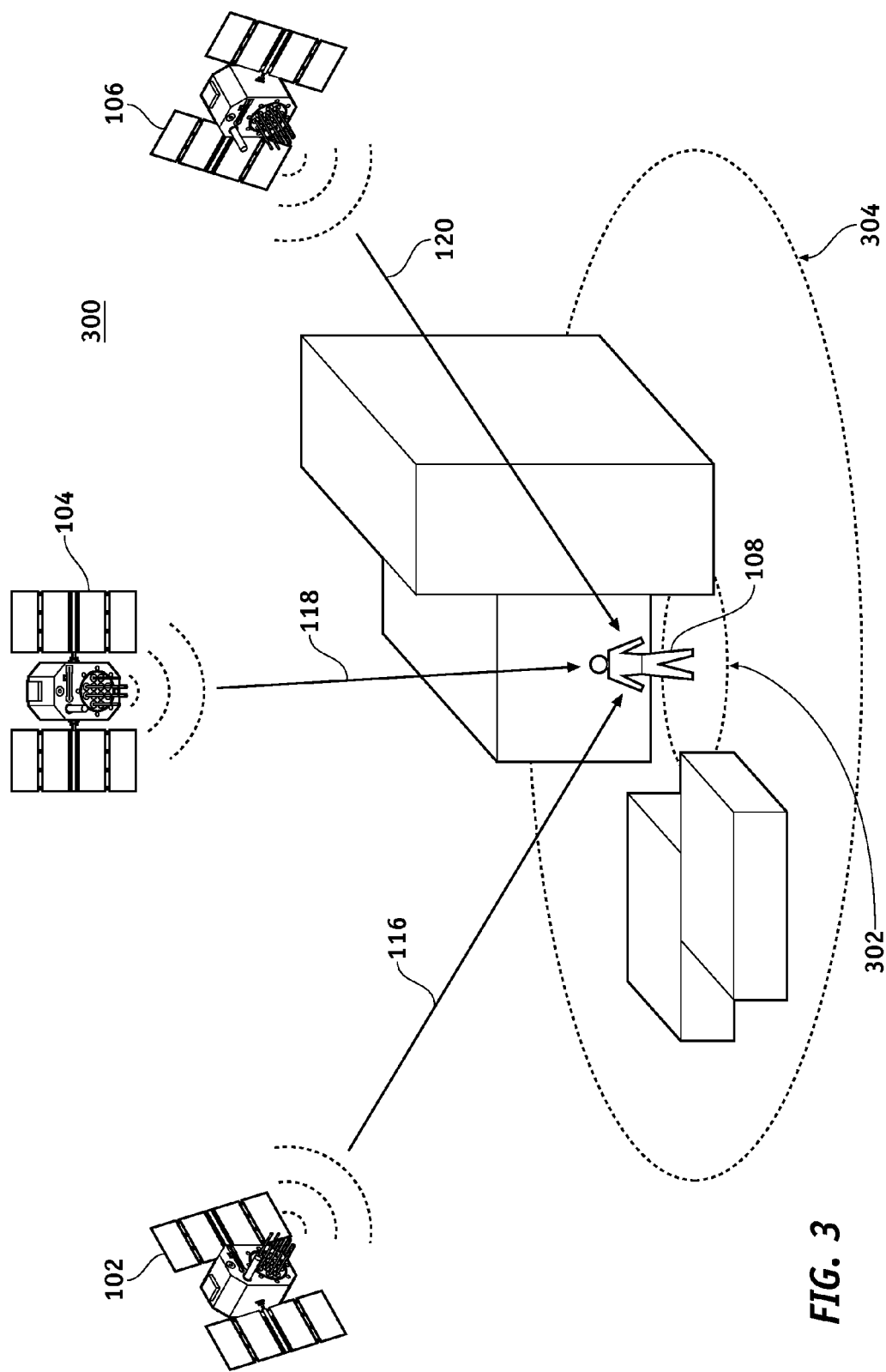
FIG. 3 is an illustration of an exemplary wireless communication environment showing ways in which indoor and downtown environments can attenuate navigation satellite signals.

FIG. 2 is an illustration of an exemplary simplified functional block diagram of the navigation satellite receiver 200 shown in FIG. 1. The navigation satellite receiver 200 may comprise, for example but without limitation, a GPS receiver, or other satellite receiver. As shown in FIG. 2, the navigation satellite receiver 200 receives radio frequency signals such as the client received satellite navigation signals 146 at the client antenna 110. The navigation satellite receiver 200 then demodulates the client received navigation signals 146 from the navigation satellite signals 116-120 received at the client 108 from the navigation satellites 102-108 respectively. The navigation satellite receiver 200 demodulates the client received navigation signals 146 from the navigation satellite signals 116-120 received at the client 108 by down converting the client received navigation signals 146 from Radio Frequency (RF) to baseband by the down convertor 202 and band pass filtering the down converted client received navigation signals 218 by the band pass filter 204.

As mentioned above, a significant fraction of a power in the secret Y code signal component of the navigation satellite signals 116-120 or the client received navigation signals 146 may be lost when the client received navigation signals 146 pass through the band pass filter 204. For GPS, signals modulated by the secret Y code signals have a noise equivalent bandwidth of 10 MHz, whereas the noise equivalent bandwidth of civil C/A code signals (C/A code) is about 1 MHz. The civil C/A code signals are utilized by the navigation satellite receiver 200 in the client 108 such as cell phones, not the secret Y code signals. Hence, the band pass filter 204 in cell phones generally has a bandwidth of only a few MHz, and so an appreciable fraction of signal power of signals comprising the secret Y codes is lost. Loss of signal power degrades performance in low signal-to-noise-ratio (SNR) environments. Degraded performance may prevent or minimize an ability of the authentication server 112 to validate that a global position computation, or an assertion based on a global position, is bona fide.

The navigation satellite receiver 200 then converts band pass filtered client received navigation signals 220 from analog signals to digital signals by an analog to digital converter (ADC) 206 to provide digital client received navigation signals 222. The navigation satellite receiver 200 then removes the spectrum-spreading code 132 (C/A code) from the digital client received navigation signals 222 by a code wipe-off 210. The navigation satellite receiver 200 then removes the in-phase carrier 130 from the digital client received navigation signals 222 by a carrier wipe-off 212 to provide clean digital client received navigation signals 224.

The navigation satellite receiver 200 then correlates the clean digital client received navigation signals 224 with a replica of the clean digital client received navigation signals 224 at the client 108 using a correlation module 214 to estimate the location 122, a velocity and a time offset of the client 108 at an output 216 based on a correlation peak 226. The location 122 can be computed using more than a minimum number of satellites (4 satellites to compute latitude, longitude, elevation, and navigation satellite/GPS time).

FIG. 3 is an illustration of an exemplary wireless communication environment (environment 300) showing indoor and downtown environments can attenuate the navigation satellite signals 116-120. A nominal received signal strength 304 of the received GPS signal is approximately −130 dBm (or 10E-16 Watts). The navigation satellite receiver 200 in the client 108 under open sky can expect the nominal received signal strength 304. However, the client 108 such as a cell phone may operate indoors in a city building where an attenuated received signal strength 302 drops to −140 dBm or −160 dBm or even weaker. Thus, the authentication server 112 should operate at these lower levels of the attenuated received signal strength 302.

Figure 4:
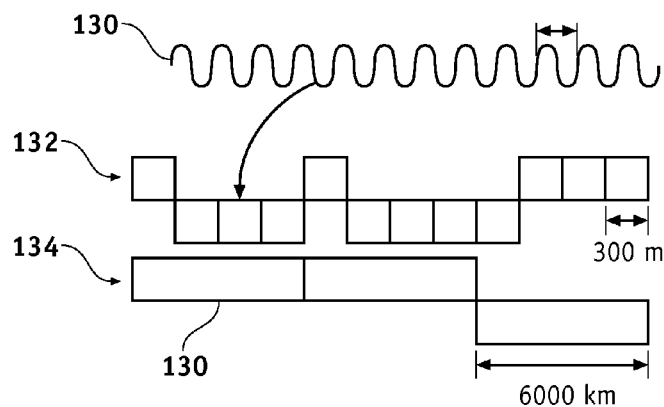
FIG. 4 is an illustration of an exemplary diagram showing a navigation message of a navigation satellite.

FIG. 4 is an illustration of an exemplary diagram 400 showing a signal structure of the navigation messages 134 of the navigation satellite 102. The navigation messages 134 modulates both the known (P) code and the unknown (Y) code (not shown) broadcast by for example the navigation satellite 102, via the navigation satellite signal 116. Embodiments of the disclosure are based on random (pseudo-random) information contained in the navigation messages 134 broadcast by the navigation satellite 102 or other navigation transmitters. For GNSS, the navigation message(s) 134 are broadcast at 50 to 1000 bit per second (bps), and are thus distinct from spectrum-spreading codes such as the unknown (Y) code (not shown) and the C/A code (spectrum-spreading code 132) that also modulate the navigation satellite signals 116 from the navigation satellite 102. The navigation messages 134 vary slowly at 50-1000 bit per second compared to the (underlying) spectrum-spreading code 132 at 1.023 Mcps (C/A code) or spectrum-spreading code at 10.23 Mcps (Y code, not shown).

The navigation message(s) 134 for the navigation satellite 102 comprise information such as location and time of the navigation satellite 102, a coarse location of the navigation satellites 104, 106 other than the navigation satellite 102, and other information. Unlike the unknown or secret code (Y), the navigation messages 134 are not attenuated by the band pass filter 204 (FIG. 2), and pass through the band pass filter 204 when the navigation satellite signal 116 passes through the band pass filter 204. Thereby, using the navigation messages 134 in low signal-to-noise-ratio (SNR) environments provide confidence for a satellite-based authentication system to validate that a global position computation, or an assertion based on a global position, is bona fide.

Compared to existing methods, embodiments of the disclosure provide better indoor and in city building coverage, because the navigation message 134 is superposed on both the civil C/A codes and secret Y codes broadcast by the navigation satellites 102. As explained above, a significant fraction of the power in the secret Y code signals component may be lost when the navigation satellite signal 116 passes through the band pass filter 204. For GPS, the signals modulated by the secret Y code signals have a noise equivalent bandwidth of 10 MHz, whereas the noise equivalent bandwidth of the civil C/A code signals is 1 MHz. The civil C/A code signals are utilized by the navigation satellite receiver 200 in the client 108 such as a cell phone, not generally the secret Y code signals. Hence, the band pass filter 204 (e.g., of the cell phone) has bandwidths of only a few MHz, and so an appreciable fraction of signal power of the secret Y code signals is lost.

Compared to existing methods, embodiments of the disclosure significantly improve indoor and downtown coverage of satellite-based authentication based on the navigation satellite receiver 200 comprised in the client 108 such as a cell phone and other relatively inexpensive platforms. Embodiments achieve this gain by using a random (pseudo random) nature of the navigation data bits 136 in the navigation message(s) 134, and not the random (pseudo-random) nature of the secret Y code signals. The navigation message 134 modulates the civil C/A code and secret Y codes, and so the above-mentioned band pass filtering loss is not incurred. This power savings may be approximately 6 dB.

In addition, a message capacity (e.g., number of data bits) occupied by a location signature (e.g., 138 in FIG. 1, and 606 in FIG. 6) based on the civil C/A code is approximately ten times smaller than the message capacity occupied by a location signature that must include the bandwidth of the secret Y code signals (Y code). For example, if a location signature including a bandwidth of the secret Y code signals occupies about 24 kBytes, then the client location signature set 138/606 according to the embodiments of the discloser may occupy about 2.4 KBytes. Alternatively, embodiments may populate a 24 KByte message, and may use an increased length of data bits to improve performance in low signal-to-noise-ratio (SNR) environments.

The navigation messages 134 that modulate the spectrum-spreading code 132 vary at 50 to 1000 bits per second. Moreover, much of the navigation message 134 can be predicted in advance. A low rate and predictability suggests that a data stream of the navigation message 134 may be a poor source of authentication signatures. However, certain portions of the navigation message 134 may be difficult to predict. Moreover, embodiments derive an authentication signature based on an overlap of the navigation message 134 for several, preferably many, satellites such as the navigation satellites 102, 104, and 106.

Figure 5:
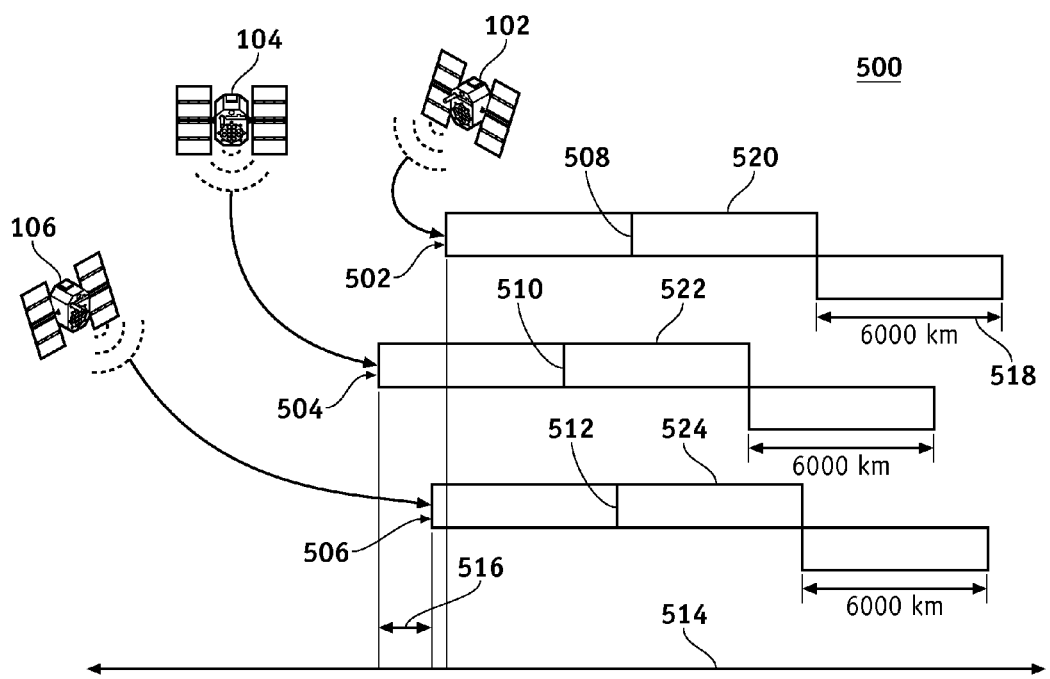
FIG. 5 is an illustration of an exemplary diagram showing overlap of navigation messages from three navigation satellites.

FIG. 5 is an illustration of an exemplary diagram 500 showing an overlap of navigation messages 502, 504, and 506 from the navigation satellites 102, 104, and 106 respectively. As shown in FIG. 5, such an overlap does have a complex structure, because navigation bit boundaries 508, 510, and 512 of each of the navigation bits 520, 522 and 524 in the navigation messages 502, 504, and 506 are shifted in time 514 from satellite to satellite. The shift in the time 514 from satellite to satellite can occur because, for example, a range from each of the navigation satellites 102-106 to the client 108 can differ appreciably. A satellite-to-satellite time shift such as the time shift 516 can be estimated using various techniques. A navigation bit duration 518 of the navigation bits 520, 522 and 524 in the navigation messages 502, 504, and 506 may comprise, for example, 20 ms~=6000 km/speed-of-light.

Figure 6:
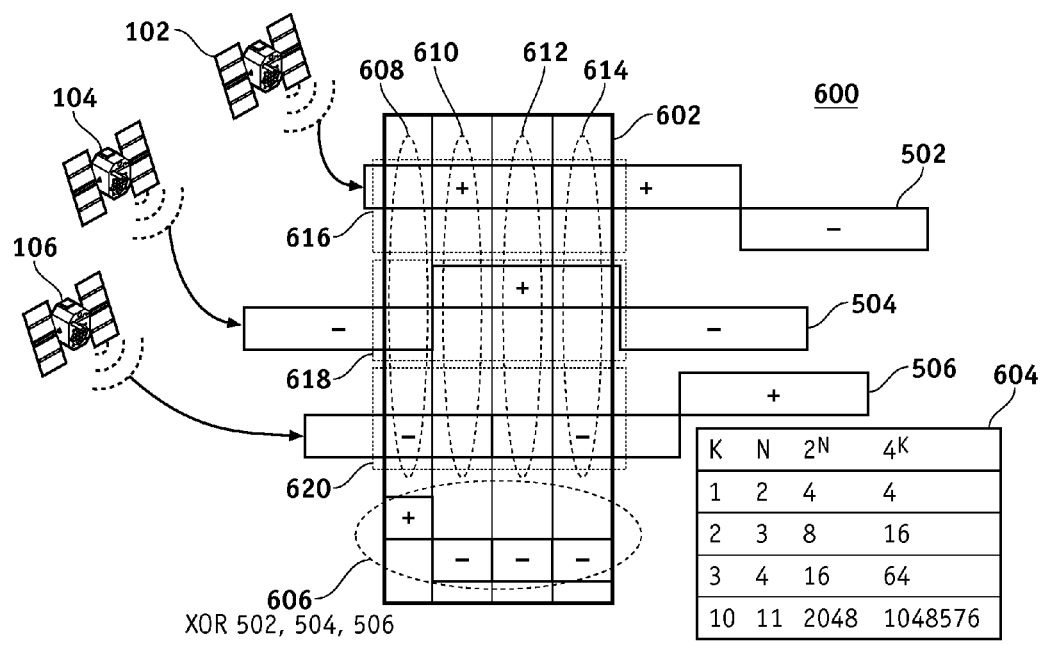
FIG. 6 is an illustration of an exemplary diagram showing the navigation messages from the three navigation satellites shown in FIG. 5 are sampled over slightly greater than one bit duration according to an embodiment of the disclosure.

FIG. 6 is an illustration of an exemplary diagram 600 showing the navigation messages 502-506 from the navigation satellites 102-106 shown in FIG. 5 are sampled over slightly greater than one navigation bit duration 518 (e.g., 20 ms FIG. 5) according to an embodiment of the disclosure. A sampling window 602 of, for example, 25 ms is slightly longer than the navigation bit duration 518 (e.g., 20 ms) for one navigation bit of each of the navigation messages 502-506. A duration of the sampling window 602 longer than the navigation bit duration 518 can guarantee that the sampling window 602 straddles a navigation bit boundary such as the navigation bit boundaries 508, 510 and 512 shown in FIG. 5. For example, four possible sequences may exist for each of the navigation satellites 102, 104 and 106 representing two navigation bits within the sampling window 602 for each of the navigation satellites 102-106. These are distinguished by two bit polarities "++", "+−", "−+" and "−−". If there are K satellites in view, then a cardinality of a location signature 606 comprising all satellite combinations for one straddled navigation bit boundary is $2^{2K}$. If the sampling window 602 is longer to cover a larger number of navigation bit boundaries, then a cardinality of the location signature set 606 increases rapidly (e.g., for 3 navigation bit boundaries $2^{4K}$, for 4 navigation bit boundaries $2^{5K}$, etc.)

In one embodiment, the location signature set 606 comprises an exclusive OR (XOR) of sample-bit strings such as sample-bit frames 616, 618 and 620 comprising the navigation data bits 136 (e.g., navigation bits 520, 522 and 524) of each of the navigation messages 502-506 from the navigation satellites 102-106 respectively. For example, sample-bit columns 608, 610, 612, and 614 of the sample-bit frames 616, 618 and 620 are XOR'd to produce the location signature set 606. The location signature set 606 may be produced by any suitable function such as, for example but without limitation, a logical XOR function, a logical OR function, a logical AND function, or other suitable function. For the client 108, the sample-bit frames 616, 618 and 620 comprise the client bit frames 1030 (FIG. 10), and the location signature set 606 comprises the client signature set 138. For the authentication server 112, the sample-bit frames 616, 618 and 620 comprise synchronized server bit frames 1032 (FIG. 10), and the location signature set 606 comprises the server signature set 140.

Thereby, a size of the location signature set 606 is reduced from a size of a combination of the sample-bit frames 616, 618 and 620. If the sampling window 602 is chosen to straddle only one navigation bit boundary, then the location signature set 606 resulting from an XOR has a cardinality of $2^{K+1}$. As shown in the Table 604 (N=K+1), the cardinality $2^{K+1}$ for XOR grows much more slowly than the cardinality $2^{2K}$ (i.e., $2^{2K}=4^K$) for all satellite combinations for one navigation bit boundary. Thus, the cardinality for an XOR of satellite navigation bit boundaries grows much more slowly than the cardinality for all combinations of satellite navigation bit boundaries.

Figure 7:
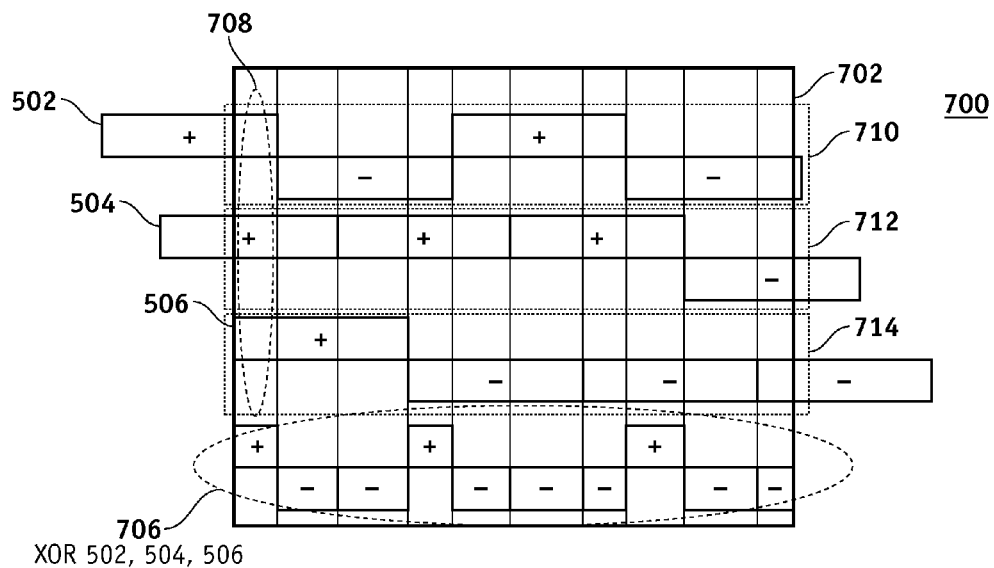
FIG. 7 is an illustration of an exemplary diagram showing the navigation messages from the three satellites shown in FIG. 5 are sampled over several bit durations according to an embodiment of the disclosure.

FIG. 7 is an illustration of an exemplary diagram 700 showing the navigation messages 502-506 from the navigation satellites 102-106 shown in FIG. 5 are sampled over several bit durations according to an embodiment of the disclosure. In the embodiment shown in FIG. 7, a location signature set 706 comprises an exclusive OR (XOR) (e.g., along a sample-bit column 708) of sample-bit strings such as sample-bit frames 710, 712 and 714 comprising navigation data bits 136 (e.g., navigation bits 520, 522 and 524) of each of the navigation messages 502-506 from the navigation satellites 102-106.

For example, sample-bit columns (e.g., the sample-bit column 708) of the sample-bit frames 710, 712 and 714 are XOR'd to produce the location signature set 706. The location signature set 706 may be produced by any suitable function such as, for example but without limitation, a logical XOR function, a logical OR function, a logical AND function, or other suitable function. For the client 108, the sample-bit frames 710, 712 and 714 comprise the client bit frames 1030 (FIG. 10), and the location signature set 706 comprises the client signature set 138. For the authentication server 112, the sample-bit frames 710, 712 and 714 comprise synchronized server bit frames 1032 (FIG. 10), and the location signature set 706 comprises the server signature set 140.

Figure 8:
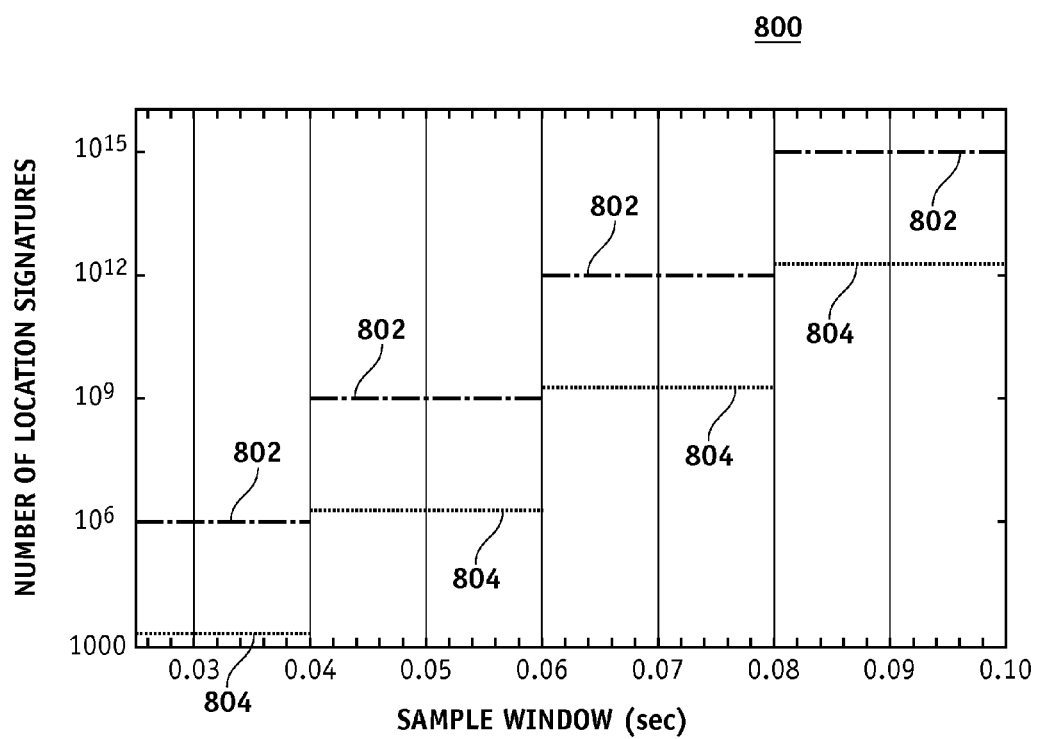
FIG. 8 is an illustration of an exemplary diagram showing a number of location signatures that can be provided according to two embodiments of the disclosure.

A sampling window 702 of 65 ms is slightly longer than 60 ms (three navigation bits at 20 ms each). In this case, the sampling window 702 straddles at least three bit boundaries, and the cardinality of the signature set is $2^{4K}$. In general, the signature set 138 contains $2^{K\text{Ceiling}[T/TB]}$ possible signatures, where T is a duration of the sampling window 602/702, and TB is the navigation bit duration 518 (FIG. 5) of a navigation bit 520. This result is plotted in FIG. 8. As shown in FIG. 8, the signature set 802 grows large very quickly as T grows beyond TB.

FIG. 8 is an illustration of an exemplary diagram showing a number of location signature 802/804 (location signature set 802/804, similar to the client signature set 138) provided according to two embodiments of the disclosure for K=10 satellites in view. FIG. 8 shows a number of location signatures vs. sampling window 602/702. The signature set 802 is plotted based on the following relationship: DataCombos[T_, TB, K_]:=$2^{K\ \text{Ceiling}[T/TB]}$. As shown in FIG. 8, the signature set 802 grows large very quickly as T grows beyond TB. Where DataCombos represent the location signature set 802 as a function of T, TB and K.

The signature set 804 are plotted for the XOR cardinality based on the following relationship: XORCombos[T_, TB, K_]:=$2^{K\ \text{Floor}[T/TB]}$. Where XORCombos represents the signature set 804 as a function of T, TB and K. Thus, XOR combination of the signature data achieves simplicity at a possible price of security. Using the XOR combination is application dependent. Each application can dictate whether this trade is appropriate based on for example a desired security level.

Figure 9:
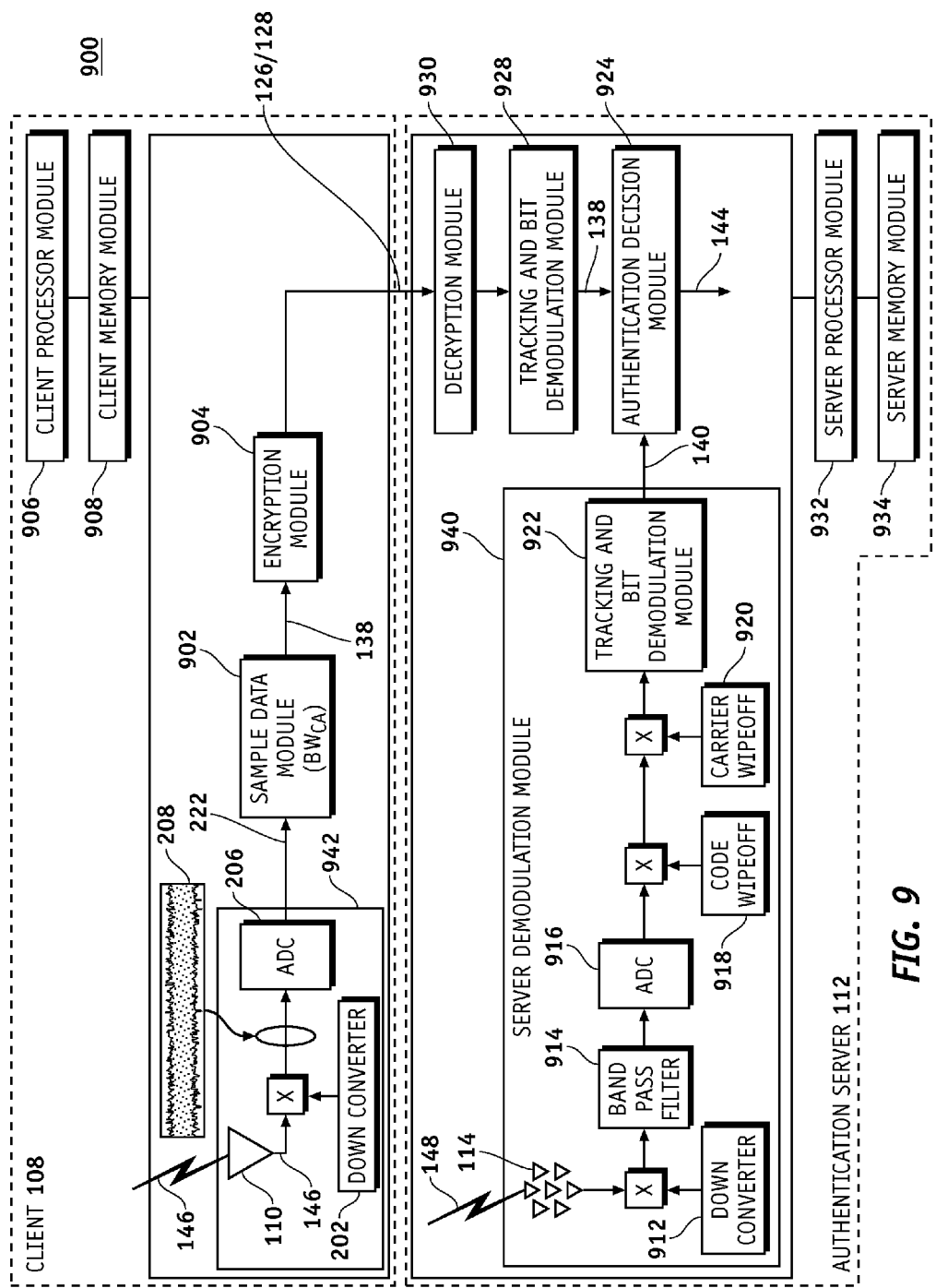
FIG. 9 is an illustration of an exemplary functional block diagram of an authentication system according to an embodiment of the disclosure.

FIG. 9 is an illustration of an exemplary functional block diagram of an authentication system 900 (system 900) according to an embodiment of the disclosure. Some embodiments of the system 900 may comprise additional components and elements configured to support known or conventional operating features that need not be described in detail herein. In the embodiment shown in FIG. 9, the system 900 can be used to transmit and receive data in the wireless communication environment 100. System 900 may have functions, material, and structures that are similar to the embodiments shown in FIGS. 1-8. Therefore common features, functions, and elements may not be redundantly described here.

The system 900 generally comprises the client 108 and the authentication server 112.

The client 108 may comprise a client demodulation module 942 comprising the down converter 202 and the ADC 206. The client 108 may further comprise a sample data module 902, an encryption module 904, a client processor module 906 (processor module 906), and a client memory module 908 (memory module 908). The client signature set 138 sent from the client 108 to the authentication server 112 comprises the RF/IF signature 208. The RF/IF signature 208 comprises samples of the client received navigation signals 146 (radio frequency (RF) or intermediate frequency (IF) signal) captured by the client antenna 110 at the client 108. The sample data module 902 samples the digital client received navigation signals 222 at the bandwidth of the C/A code ($BW_{CA}$) to provide the client signature set 138.

In the embodiment shown in FIG. 9, the client 108 need not track the client received navigation signals 146 nor demodulate the navigation data bits 136 of the navigation message 134. As shown in FIG. 9, tracking and bit demodulation are performed by a tracking and bit demodulation module 928 located at the authentication server 112.

The authentication server 112 may comprise the server antenna 114, a server demodulation module 940, an authentication decision module 924, a tracking and bit demodulation module 922, a decryption module 930, a server processor module 932 (processor module 932) and a server memory module 934 (memory module 934).

The server demodulation module 940 comprises, a down converter 912 configured to perform conversion from RF to baseband, a band pass filter 914 configured to perform a band pass filtering, an ADC 916 configured to perform analog to digital conversion, a code wipeoff 918 configured to remove the spectrum-spreading code 132 (C/A code), and a carrier wipeoff 920 configured to remove the in-phase carrier 130.

The tracking and bit demodulation module 922 is configured to estimate the navigation data bits 136 of the navigation message 134 from the server received navigation signals 148 to provide the server signature set 140.

The tracking and bit demodulation module 928 is configured to estimate the navigation data bits 136 of the navigation message 134 contained in the RF/IF signature 208 from the client 108 to provide the client signature set 138.

The authentication decision module 924 compares the client signature set 138 and the server signature set 140 to generate the authentication decision message 144 based on the comparison. This comparison can be made on a satellite-by-satellite data comparison basis or based on any number of intermediate functions such as, for example but without limitation, a logical XOR function, a logical OR function, a logical AND function, or other function suitable for operation of the system 900 as explained in more detail in the context of discussion of FIG. 10 below.

Encryption module 904 and decryption module 930 are used to further strengthen authentication performance. A client-unique key (or device signature) is concatenated with a GNSS signature set from the client (client signature set 138). The client-unique key may be based on, for example but without limitation, cryptographic symmetric cryptography (e.g., AES), asymmetric cryptography (e.g. public-private cryptography), physically unclonable functions (PUFs), or other cryptography. The client-unique key is used to modify the client signature set 138 so that position verification at the authentication server 112 requires a copy of the client-unique key. The decryption module 930 may be used to decrypt communication from the encryption module 904. Alternatively, the client-unique key may be used to modify the server signature set 140 in the same manner as the client signature set 138. Thereby, comparison and authentication of the client signature set 138 with the server signature set 140 is generally only successful if the client 108 and the authentication server 112 use a same client-unique key.

A navigation satellite signature can be considered as a plaintext for a device encryption. The navigation satellite signature may also contain an underlying client position velocity time feedforward (PVTF) information that will also be verified by correlating the navigation satellite signature captured by the client 108 with corresponding data at a navigation satellite reference receiver. Thus, a concatenated security system is generated.

Processor modules 906/932 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like.

A processor may also be implemented as a combination of computing devices, e.g., a combination of a digital signal processor and a microprocessor, a plurality of microprocessors, one or more microprocessors in conjunction with a digital signal processor core, or any other such configuration. In practice, processor modules 906/934 comprise processing logic that is configured to carry out the functions, techniques, and processing tasks associated with the operation of the system 900.

In particular, the processing logic is configured to support the authentication method described herein. For, example the client processor module 906 may be suitably configured to send the client signature set 138 from the client 108 to the authentication server 112 via a client transmit antenna (not shown). For another example, the server processor module 932 may be suitably configured to send the authentication decision message 144 to another server or to the client 108 via a server transmit antenna (not shown). Furthermore, the steps of a method or algorithm described in connection with the embodiments disclosed herein may be embodied directly in hardware, in firmware, in a software module executed by processor modules 906/932, or in a combination thereof.

The memory modules 908/934, may be realized as a non-volatile storage device (non-volatile semiconductor memory, hard disk device, optical disk device, and the like), a random access storage device (for example, SRAM, DRAM), or any other form of storage medium known in the art. The memory module 908/934 may be coupled to the processor modules 906/932 respectively such that the processor modules 906/932 can read information from, and write information to, memory modules 908/934.

As an example, the processor module 906 and memory module 908, the processor module 932 and the memory module 934 may reside in their respective ASICs. The memory modules 908 and 934 may also be integrated into the processor modules 906 and 932 respectively. In an embodiment, the memory module 908/934 may include a cache memory for storing temporary variables or other intermediate information during execution of instructions to be executed by processor modules 906/932. The memory modules 908/934 may also include non-volatile memory for storing instructions to be executed by the processor modules 906/932.

For example, the memory modules 908/934 may include a location database (not shown) for storing the location signature set 802/804, and other data in accordance with an embodiment of the disclosure. For another example, the client memory module 908 may store the replica of the digital client received navigation signals 222 at the client 108. Those skilled in the art will understand that the various illustrative blocks, modules, circuits, and processing logic described in connection with the embodiments disclosed herein may be implemented in hardware, computer-readable software, firmware, or a combination thereof. To clearly illustrate this interchangeability and compatibility of hardware, firmware, and software, various illustrative components, blocks, modules, circuits, and steps are described generally in terms of their functionality.

In some embodiments, system 900 may comprise any number of processor modules, any number of memory modules, any number of transmitter modules, and any number of receiver modules suitable for their operation described herein. The illustrated system 900 depicts a simple embodiment for ease of description. These and other elements of the system 900 are interconnected together, allowing communication between the various elements of system 900. In one embodiment, these and other elements of the system 900 may be interconnected together via a data communication bus (not shown).

A transmitter module (not shown) and a receiver module (not shown) may be located in each processor module 906/932 coupled to their respective shared antenna (not shown). Although in a simple module only one shared antenna may be used, more sophisticated modules may be provided with multiple and/or more complex antenna configurations. Additionally, although not shown in this FIG. 9, those skilled in the art will recognize that a transmitter may transmit to more than one receiver, and that multiple transmitters may transmit to the same receiver.

Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present invention.

FIG. 10 is an illustration of an exemplary block diagram showing an authentication system 1000 (system 1000) according to an embodiment of the disclosure. The system 1000 may comprise a client data frame selector module 1006, a client data operation module 1002, a server data frame selector module 1010, and a server data operation module 1004.

The client data frame selector module 1006 and the client data operation module 1002 may be implemented in the client 108 or in the server 112 so as to receive a plurality of demodulated client received navigation signals 1020 such as the navigation messages 502/504/506 as an input and generate the client signature set 138 as an output. In various embodiments, the client data frame selector module 1006 and/or the client data operation module 1002 may be located in, for example, the authentication decision module 924, the tracking and bit demodulation module 928, a bit selector module 1104 (FIG. 11), a tracking and bit demodulation module 1102 (FIG. 12), or other suitable location.

In various embodiments, server data frame selector module 1010 and/or the server data operation module 1004 may be located in, for example, the authentication decision module 924, the tracking and bit demodulation module 922, or other suitable location.

For example but without limitation, the demodulated client received navigation signals 1020 may be produced by the tracking and bit demodulation module 928. The server data frame selector module 1010 and the server data operation module 1004 may be implemented in the authentication decision module 924 of the system 900 so as to receive a plurality of demodulated server received navigation signals 1022 such as the navigation messages 502/504/506 as an input and generate the server signature set 140 as an output. For example but without limitation, the demodulated server received navigation signals 1022 may be produced and synchronized to the demodulated client received navigation signals 1020 by the tracking and bit demodulation module 922.

The client data frame selector module 1006 is configured to select a subset of the demodulated client received navigation signals 1020 to provide a plurality of client bit frames 1030. The subset may comprise, for example but without limitation, a subframe, a random selection, and a selection of bits from most dynamic bits, or other subset.

The client data operation module 1002 is configured to compute a function such as an XOR 1008 of the client bit frames 1030 to provide a client signature set 138. The function may comprise, for example but without limitation, a logical XOR function, a logical OR function, a logical AND function, or other suitable function.

The server data frame selector module 1010 is configured to select a subset of the demodulated server received navigation signals 1022 synchronized to the client bit frames 1030 to provide a plurality of synchronized server bit frames 1032.

The server data operation module 1004 is configured to compute the function such as an XOR 1012 of the synchronized server bit frames 1032 to provide a server signature set 140.

The server correlation module 142 is configured to compare the client signature set 138 and the server signature set 140 to provide a comparison result such as the authentication decision message 144. The authenticate decision module 924 is configured to generate the authentication decision message 144 to authenticate the location 122 of the client 108 based on the comparison result. This comparison can be made on a satellite-by-satellite data comparison basis or based on any number of intermediate functions such as, for example but without limitation, a logical XOR function, a logical OR function, a logical AND function, or other suitable function.

Figure 11:
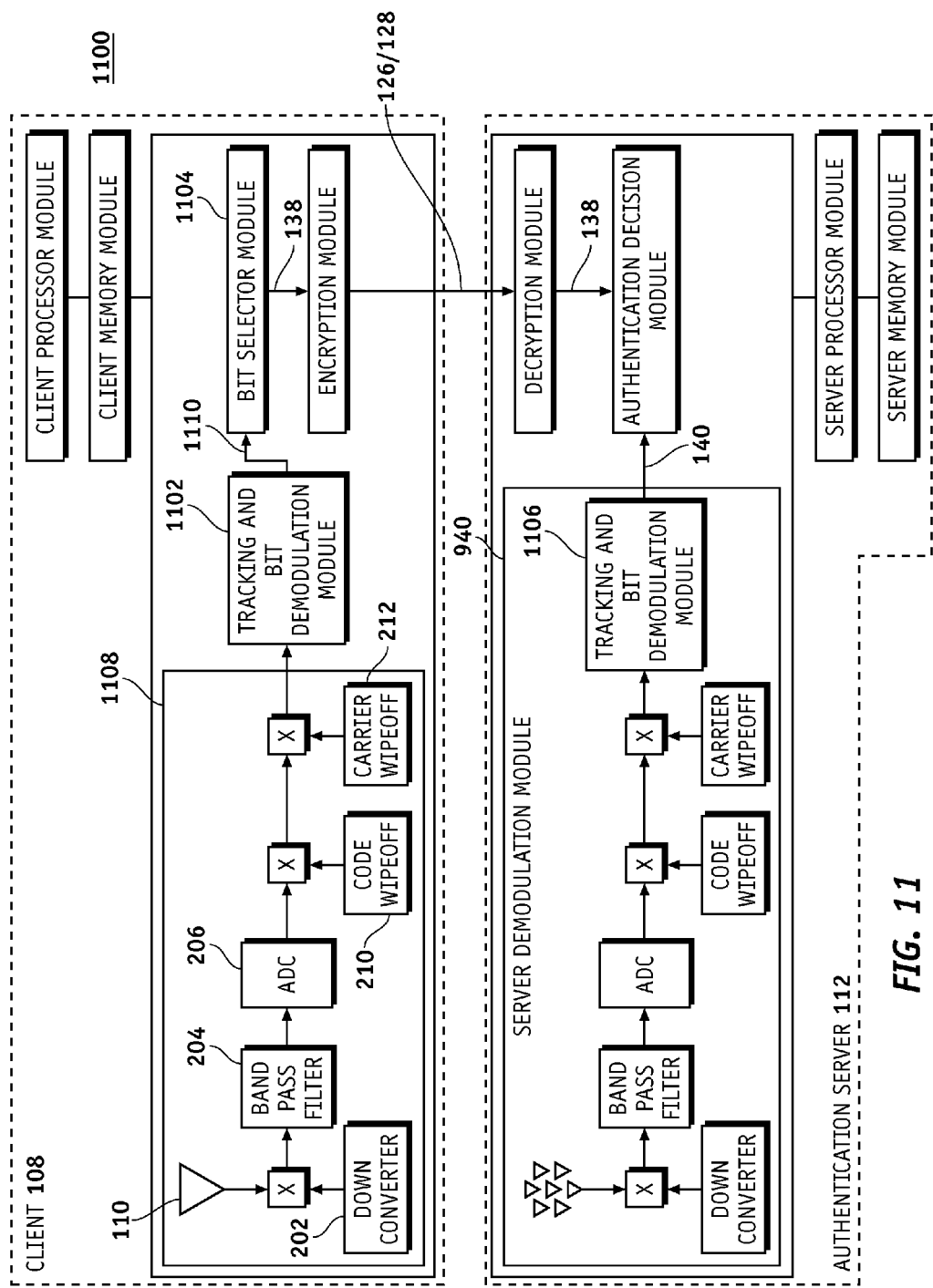
FIG. 11 is an illustration of an exemplary functional block diagram of an authentication system according to an embodiment of the disclosure.

FIG. 11 is an illustration of an exemplary functional block diagram of an authentication system 1100 (system 1100) according to an embodiment of the disclosure. System 1100 may have functions, material, and structures that are similar to the embodiments shown in FIGS. 1-9. Therefore common features, functions, and elements may not be redundantly described here.

System 1100 may comprise the client 108 and the authentication server 112 (server device). The client 108 may comprise, a client demodulation module 1108 comprising, the down converter 202 configured to perform conversion from RF to baseband, the band pass filter 204 configured to perform a band pass filtering, the ADC 206 configured to perform analog to digital conversion, the code wipeoff 210 configured to remove the spectrum-spreading code 132 (C/A code), and the carrier wipeoff 212 configured to remove the in-phase carrier 130. The client 108 may also comprise the tracking and bit demodulation module 1102, and the bit selector module 1104.

The bit selector module 1104 is configured to choose navigation data bits 136 from portions of the navigation messages 134 that are known to vary unpredictably. The bit selector module 1104 identifies frames, subframes and words in the navigation message 134, and selects a multiplicity of words that are known to contain variable data. The bit selector module 1104 avoids fields that change infrequently and thus are readily predicted. For example, data fields that describe the navigation satellites 102-106 ephemeris would be avoided by the bit selector module 1104.

An advantage of the system 1100 is that the client 108 can use the bit selector module 1104 to choose navigation data bits 136 from portions of the navigation messages 134 that are known to vary unpredictably. Some part of the navigation messages 134 may be very predictable and so may be prone to spoofing. Using samples of the navigation messages 134 that are dynamic where the navigation data bits 136 change often randomizes the client signature set 138.

System 1100 makes use of the tracking and bit demodulation module 1102 that is generally present in many GPS receivers which may be present in various GPS receivers for cell phones. The client 108 tracks the client received navigation signals 146 and demodulates the navigation data bits 136 of the navigation message 134 using the tracking and bit demodulation module 1102 to estimate the navigation data bits 136. The estimated navigation data bits 1110 are then used by the bit selector module 1104 to choose navigation data bits from portions of the navigation messages 134 that are known to vary unpredictably to provide the client signature set 138. The client signature set 138 is then sent to the authentication server 112 for comparison with the server signature set 140.

Figure 12:
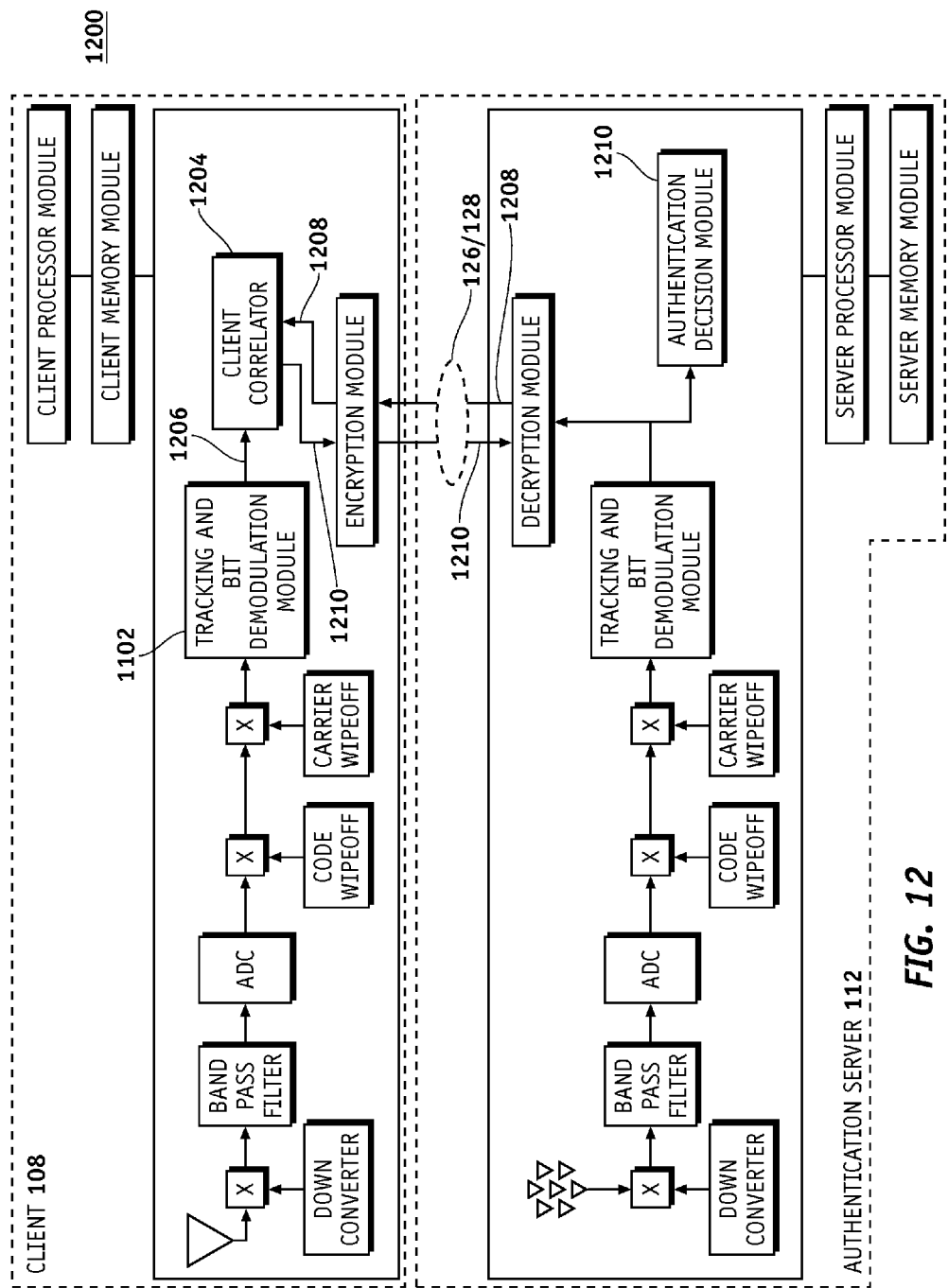
FIG. 12 is an illustration of an exemplary functional block diagram of an authentication system according to an embodiment of the disclosure.

FIG. 12 is an illustration of an exemplary functional block diagram of an authentication system 1200 (system 1200) according to an embodiment of the disclosure. System 1200 may have functions, material, and structures that are similar to the embodiments shown in FIGS. 1-11. Therefore common features, functions, and elements may not be redundantly described here.

FIG. 12 shows an embodiment where the authentication server 112 provides a test waveform 1208 to the client 108. In other words, the authentication server 112 pushes a candidate signature out to the client 108. The test waveform 1208 may be a binary sequence or may be an XOR operation of the navigation data bit 136 for the satellites known to be in view of the client 108. The client 108 correlates or compares the test waveform 1208 at the client correlator 1204 with the navigation bits 1206 demodulated at the client 108 by the tracking and demodulator module 1120, and sends the correlation information 1210 of this correlation (or comparison) back to the authentication server 112. The authentication server 112 makes the final authentication decision based on the correlation information 1210 from the client 108.

In the embodiments shown in FIGS. 9-12 and described above, the authentication action may be initiated by any of the following events:

The client 108 wishes to complete a transaction or request.

The client 108 is prompted to seek authentication based on its interaction with a point-of-sale terminal or near field communication (NFC).

The client 108 is in a pre-established safe zone such as home or work, and wishes to pre-establish authentication for anticipated transactions or requests.

The client 108 is in a pre-established safe zone, and wishes to post-authenticate a transaction or request that has taken place in the recent past.

The client 108 senses that the GNSS signals are becoming weaker, and thus want to pre-establish authentication for potential indoor transactions or requests.

The authentication server 112 (server device) requests an authentication action.

Figure 13:
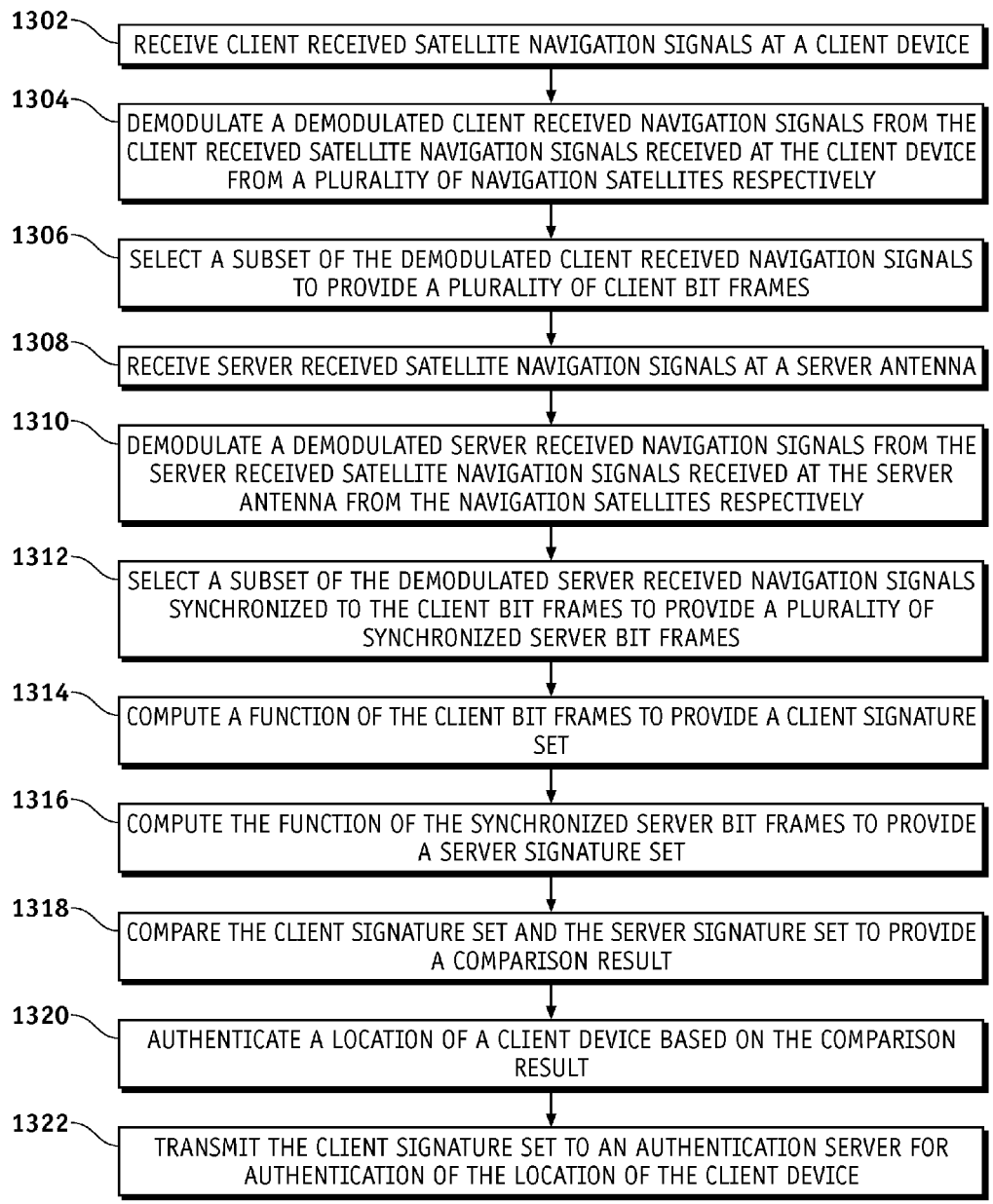
FIG. 13 is an illustration of an exemplary flowchart showing an authentication process according to an embodiment of the disclosure.

FIG. 13 is an illustration of an exemplary authentication process according to an embodiment of the disclosure. The various tasks performed in connection with the process 1300 may be performed by software, hardware, firmware, a computer-readable medium having computer executable instructions for performing the process method, or any combination thereof. The process 1300 may be recorded in a computer-readable medium such as a semiconductor memory, a magnetic disk, an optical disk, and the like, and can be accessed and executed, for example, by a computer CPU such as the processor modules 906/932 in which the computer-readable medium is stored.

It should be appreciated that process 1300 may include any number of additional or alternative tasks, the tasks shown in FIG. 13 need not be performed in the illustrated order, and process 1300 may be incorporated into a more comprehensive procedure or process having additional functionality not described in detail herein. In some embodiments, portions of the process 1300 may be performed by different elements of the systems 900-1200 such as: the client 108, the authentication server 112, etc. Process 1300 may have functions, material, and structures that are similar to the embodiments shown in FIGS. 1-12. Therefore common features, functions, and elements may not be redundantly described here.

Process 1300 may begin by receiving client received satellite navigation signals such as the client received satellite navigation signals 146 at a client device such as the client device 108 (task 1302).

Process 1300 may then continue by demodulating the demodulated client received navigation signals such as the navigation messages 502/504/506 from the client received satellite navigation signals 146 received at the client device 108 from a plurality of navigation satellites such as the navigation satellites 102-106 respectively (task 1304). In some embodiments, demodulating the demodulated client received navigation signals from the client received satellite navigation signals 146 may comprise conversion from RF to baseband, and analog to digital conversion. In some embodiments, demodulating the demodulated client received navigation signals from the client received satellite navigation signals 146 further comprises code wipe-off and carrier wipe-off. The navigation satellites may comprise, for example but without limitation, a Global Navigation Satellite System (GNSS) satellite, a Global Positioning System (GPS™) satellite, a Globalnaya Navigatsionnaya Sputnikovaya Sistema (GLONASS™) satellite, a BeiDou Navigation System (COMPASS™) satellite, a Galileo™ satellite, or other satellite navigation system. The demodulated client received navigation signals 502/504/506 and the navigation messages 502/504/506 may be used interchangeably in this document.

Process 1300 may then continue by selecting a subset of the plurality of demodulated client received navigation signals to provide a plurality of client bit frames such as the client bit frames 1030 (task 1306). The subset may comprise, for example but without limitation, a subframe, a random selection, a selection of bits from most dynamic bits, or other subset.

Process 1300 may then continue by receiving a server received satellite navigation signals such as the server received satellite navigation signals 148 at a server antenna such as the serve antenna 114 (task 1308).

Process 1300 may then continue by demodulating the demodulated server received navigation signals such as the navigation messages 502/504/506 from the server received satellite navigation signals 148 received at the server antenna 114 from the navigation satellites 102-104 respectively (task 1310). In some embodiments, demodulating the demodulated server received navigation signals such as the navigation messages 502/504/506 from the server received navigation satellite signals 148 comprises conversion from RF to baseband, band pass filtering, analog to digital conversion, code wipe-off, and carrier wipe-off. The demodulated server received navigation signals 502/504/506 and the navigation messages 502/504/506 may also be used interchangeably in this document.

Process 1300 may then continue by selecting a subset of the demodulated server received navigation signals such as the navigation messages 502/504/506 synchronized to the client bit frames 1030 to provide a plurality of synchronized server bit frames such as the synchronized server bit frames 1032 (task 1312).

Process 1300 may then continue by computing a function of the client bit frames 1030 to provide a client signature set such as the client signature set 138 (task 1314). The function may comprise, for example but without limitation, a logical XOR function, a logical OR function, a logical AND function, or other function.

Process 1300 may then continue by computing the function of the synchronized server bit frames 1032 to provide a server signature set such as the server signature set 140 (task 1316).

Process 1300 may then continue by comparing the client signature set 138 and the server signature set 140 to provide a comparison result such as the authentication decision message 144 (task 1318).

Process 1300 may then continue by authenticating a location such as the location 122 of the client device 108 based on the comparison result (task 1320). Authenticating indicates a validity that there is acceptable accuracy and/or certainty that the client 108 is located at the location 122, or indicates invalidity that there is not acceptable accuracy and/or certainty that the client 108 is located at the location 122.

Figure 14:
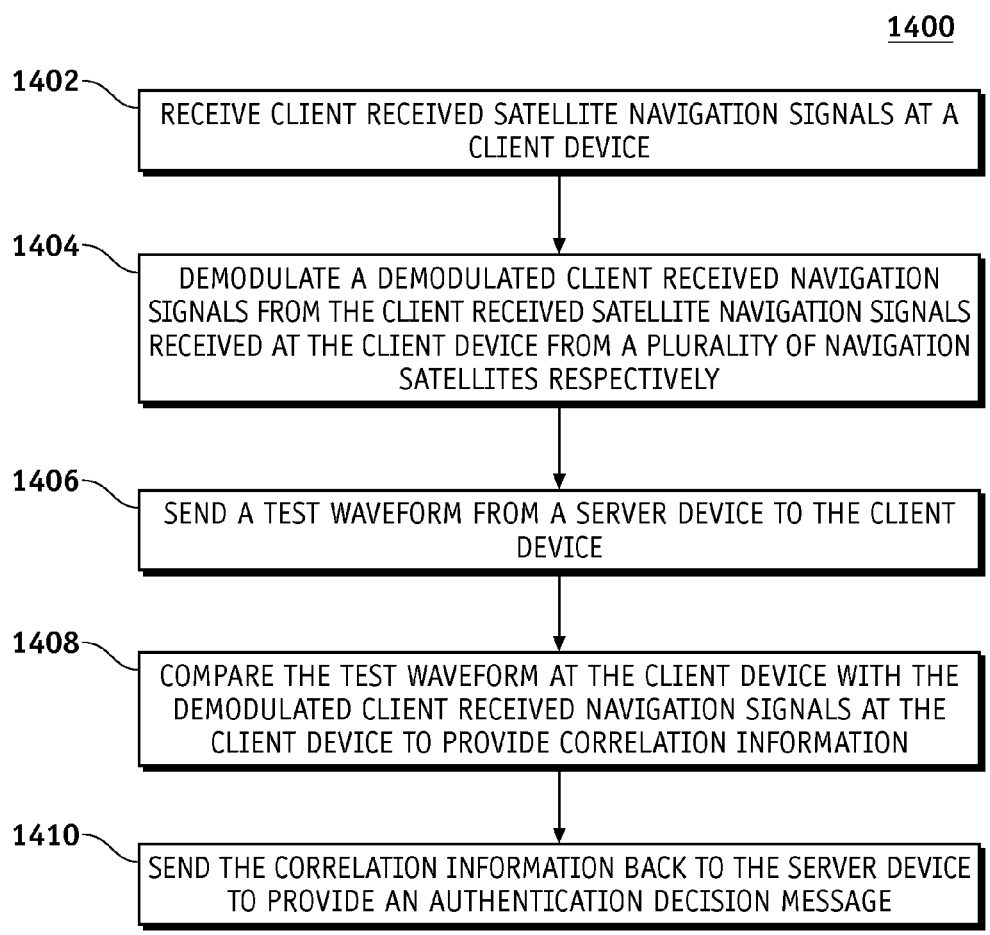
FIG. 14 is an illustration of an exemplary flowchart showing an authentication process according to an embodiment of the disclosure.

FIG. 14 is an illustration of an exemplary authentication process according to an embodiment of the disclosure. The various tasks performed in connection with the process 1400 may be performed by software, hardware, firmware, a computer-readable medium having computer executable instructions for performing the process method, or any combination thereof. The process 1400 may be recorded in a computer-readable medium such as a semiconductor memory, a magnetic disk, an optical disk, and the like, and can be accessed and executed, for example, by a computer CPU such as the processor modules 906/932 in which the computer-readable medium is stored.

It should be appreciated that process 1400 may include any number of additional or alternative tasks, the tasks shown in FIG. 14 need not be performed in the illustrated order, and process 1300 may be incorporated into a more comprehensive procedure or process having additional functionality not described in detail herein. In some embodiments, portions of the process 1300 may be performed by different elements of the systems 900-1200 such as: the client 108, the authentication server 112, etc. Process 1400 may have functions, material, and structures that are similar to the embodiments shown in FIGS. 1-12. Therefore common features, functions, and elements may not be redundantly described here.

Process 1400 may begin by receiving a client received satellite navigation signals such as the client received navigation signals 146 at a client device such as the client device 108 (task 1402).

Process 1400 may then continue by demodulating the demodulated client received navigation signals such as the navigation messages 502/504/506 from the client received satellite navigation signals received at the client device 108 from a plurality of navigation satellites such as the navigation satellites 102-108 respectively (task 1404).

Process 1400 may then continue by sending a test waveform such as the test waveform 1208 from a server device such as the server device 112 to the client device 108 (task 1406).

Process 1400 may then continue by comparing the test waveform 1208 at the client device 108 with the demodulated client received navigation signals at the client device 108 to provide correlation information such as the correlation information 1210 (task 1408).

Process 1400 may then continue by sending the correlation information 1210 back to the server device 112 to provide an authentication decision message such as the authentication decision message 144 (task 1410).

In this manner, embodiments of the disclosure provide an authentication system that allows adequate sensitivity for a navigation satellite signal to be received at a client device located in a low signal-to-noise-ratio (SNR) environment such as indoors and downtown.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In this document, the term "module" as used herein, refers to software, firmware, hardware, and any combination of these elements for performing the associated functions described herein. Additionally, for purpose of discussion, the various modules are described as discrete modules; however, as would be apparent one of skilled in the art, two or more modules may be combined to form a single module that performs the associated functions according the embodiments of the present disclosure.

In this document, the terms "computer program product", "computer-readable medium", and the like may be used generally to refer to media such as, for example, memory, storage devices, or storage unit. These and other forms of computer-readable media may be involved in storing one or more instructions for use by the processor modules 906/932 to cause the processor modules 906/932 to perform specified operations. Such instructions, generally referred to as "computer program code" or "program code" (which may be grouped in the form of computer programs or other groupings), when executed, enable a method of using a system such as the system 900-1200.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-12 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A method for location authentication, the method comprising:
   demodulating a plurality of demodulated client received navigation signals from a plurality of client received satellite navigation signals received at a client device from a plurality of navigation satellites respectively;
   selecting a subset of the demodulated client received navigation signals to provide a plurality of client bit frames;
   computing a function of the client bit frames to provide a client signature set;
   selecting a subset of a plurality of demodulated server received navigation signals synchronized to the client bit frames to provide a plurality of synchronized server bit frames;
   computing the function of the synchronized server bit frames to provide a server signature set;
   comparing the client signature set and the server signature set to provide a comparison result; and
   authenticating a location of the client device based on the comparison result.

2. The method of claim 1, wherein the function comprises one of: a logical XOR function, a logical OR function, and a logical AND function.

3. The method of claim 1, wherein demodulating the demodulated client received navigation signals from the client received satellite navigation signals comprises:
   conversion from RF to baseband;
   band pass filtering; and
   analog to digital conversion.

4. The method of claim 3, wherein demodulating the demodulated client received navigation signals from the client received satellite navigation signals further comprises:
   code wipe-off; and
   carrier wipe-off.

5. The method of claim 3, wherein the authenticating step further comprises:
   sending a test waveform from a server device to the client device;
   comparing the test waveform at the client device with the demodulated client received navigation signals at the client device to provide correlation information; and
   sending the correlation information back to the server device to provide an authentication decision message.

6. The method of claim 1, further comprising receiving the client received satellite navigation signals at the client device.

7. The method of claim 1, further comprising demodulating the demodulated server received navigation signals from a plurality of server received satellite navigation signals received at a server antenna from the navigation satellites respectively.

8. The method of claim 7, further comprising receiving the server received satellite navigation signals at the server antenna.

9. The method of claim 7, wherein demodulating the demodulated server received navigation signals from the satellite navigation signals comprises:
   conversion from RF to baseband;
   band pass filtering;
   analog to digital conversion;
   code wipe-off; and
   carrier wipe-off.

10. The method of claim 1, wherein the subset comprises one of: a subframe, a random selection, and a selection of bits from most dynamic bits.

11. A location authentication system comprising:
    a client demodulation module operable to:
       receive a plurality of client received satellite navigation signals at a client device from a plurality of navigation satellites respectively; and
       demodulate a plurality of demodulated client received navigation signals from the client received satellite navigation signals;
    a client data frame selector module operable to select a subset of the demodulated client received navigation signals to provide a plurality of client bit frames;
    a client data operation module operable to compute a function of the client bit frames to provide a client signature set;
    a server data frame selector module operable to select a subset of a plurality of demodulated server received navigation signals synchronized to the client bit frames to provide a plurality of synchronized server bit frames;
    a server data operation module operable to compute the function of the synchronized server bit frames to provide a server signature set;
    a server correlation module operable to compare the client signature set and the server signature set to provide a comparison result; and
    an authenticate module operable to authenticate a location of the client device based on the comparison result.

12. The system of claim 11, wherein the client demodulation module is further operable to:
    perform conversion from RF to baseband;
    band pass filtering; and
    perform analog to digital conversion.

13. The system of claim 11, wherein the client demodulation module is further operable to:
    perform code wipe-off; and
    perform carrier wipe-off.

14. The system of claim 11, further comprising a server demodulation module operable to:
    receive a plurality of server received satellite navigation signals at a server device from the navigation satellites respectively; and
    demodulate the demodulated server received navigation signals from the server received satellite navigation signals.

15. The system of claim 14, wherein the server demodulation module is further operable to:
    perform conversion from RF to baseband;
    band pass filtering;
    perform analog to digital conversion;
    perform code wipe-off; and
    perform carrier wipe-off.

16. A location authentication system comprising:
a client data frame selector module operable to select a subset of a plurality of demodulated client received navigation signals to provide a plurality of client bit frames;
a client data operation module operable to compute a function of the client bit frames to provide a client signature set;
a server demodulation module operable to:
- receive a plurality of server received satellite navigation signals at a server device from the navigation satellites respectively; and
- demodulate a plurality of demodulated server received navigation signals from the server received satellite navigation signals;

a server data frame selector module operable to select a subset of the demodulated server received navigation signals synchronized to the client bit frames to provide a plurality of synchronized server bit frames;
a server data operation module operable to compute the function of the synchronized server bit frames to provide a server signature set;
a server correlation module operable to compare the client signature set and the server signature set to provide a comparison result; and
an authenticate module operable to authenticate a location of a client device based on the comparison result.

17. The system of claim 16, wherein the server demodulation module is further operable to:
perform conversion from RF to baseband;
band pass filtering;
perform analog to digital conversion;
perform code wipe-off; and
perform carrier wipe-off.

* * * * *